Patented Jan. 29, 1952

2,584,082

UNITED STATES PATENT OFFICE 2,584,082

METHOD OF MAKING RIGID FOAM COMPOSITION

Pat Macaluso, Bronxville, N. Y., assignor to Foster D. Snell, Inc., New York, N. Y., a corporation of New York No Drawing. Application April 26, 1948, Serial No. 23,387

5 Claims. (Cl. 106—122)

This invention relates to a protein foam composition and method of manufacture.

The invention is particularly useful in making thermal insulating foamboard and will be illustrated by description first in connection with such article.

It has been known that glue foams can be set and made into shaped articles of low density and low coefficient of thermal conductivity.

In spite of these and other known desirable properties of the foams, difficulties inherent in the process of manufacture and disadvantages of the finished products have retarded the development of the foam insulation on a commercial basis. The foams have been lacking in stability at elevated temperatures such as those required in drying at a rate adequate to make the process economical and satisfactorily rapid in commercial manufacture of the forms. Foamboards, for instance, prepared as heretofore and then dried at 100° C. or above, are brittle friable articles. Also there has been difficulty due to collapse, shrinkage and coarsening of the foam structure during formation and drying of the foamboard, lack of flameproofness, and susceptibility of the foam to mold and to attack by insects, rodents and like animals utilizing protein as a food.

The present invention provides a protein foam composition and method that makes possible the rapid production of light weight articles, such as foamboard, that are stable during drying at elevated temperatures, retain the gas bubbles in fine foam, are tough, light in weight, effective as heat insulation, and resistant to molds and animals, free of objectionable odor, and not readily disintegrated by water.

Briefly stated, the invention comprises the article resulting from and the method of making an aqueous solution of a water soluble protein composition, an inorganic protein insolubilizing and toughening agent, and an anion-active surface tension lowering material serving as a foaming agent, admixing a fibrous reinforcing material serving to increase the average fineness of the bubbles, increase the strength, and decrease the brittleness of the finished product, foaming the resulting mixture by introducing gas in subdivided form thereinto, and then drying the foamed mass at an elevated temperature. In the form preferred for commercial use, the foamed solution is shaped into a board on a sheet element such as kraft paper; on drying, the composition adheres to the sheet element. In a modification, the product includes an admixed waterproofing or water resisting material of which asphalt is an example.

Using the method and the composition described, I have made foamboards of density as low as 1 to 2 pounds to the cubic foot with a coefficient of thermal conductivity of around 0.2 to 0.3 in the engineering system of units, the air cells in the finished product being closed and practically uniformly distributed throughout the entire mass. In all instances, the product of the present invention is an article in which the protein forms a continuous structure and is the continuous phase, while the included bubbles of air is the discontinuous phase.

In articles made as described the fibers are closely spaced and substantially uniformly distributed. The vesicles in the protein foam are very fine, bordering on microscopic. The fibers extend throughout the entire mass at close intervals. They decrease the firmness and frequency of bubble to bubble contact, as shown by preventing brittleness and making the article somewhat yieldable and springy.

The fibers also promote evaporation of water from inner parts of the article if wet accidentally or by condensation during use. The effect of the fibers is best demonstrated during manufacture of the block. With the fibers mixed throughout the wet foam, the foam may be dried quickly and effectively at 100° C., with the production of a good strong product. With the fibers omitted, compositions that are otherwise comparable cannot be dried satisfactorily at such high temperature and usually not above 35° C.

As the protein used, glue is particularly satisfactory and is preferred. It requires no solubilizing agent to dissolve it in the water used in the preparation of the initial solution.

As the agent dissolved with the protein for the purpose of ultimately insolubilizing and toughening or hardening the protein, there is used a water soluble inorganic protein tanning agent selected from the group consisting of chromium, aluminum and ferric salts. Examples of such agents that are particularly satisfactory are basic chromium sulfate, aluminum sulfate, and ferric sulfate. Particularly satisfactory results have been obtained with a soluble chromium salt, i. e. the sulfate, chloride, or acetate, and that is the agent which is recommended for commercial use, the sulfate being especially satisfactory and the basic sulfate being preferred.

The use of these inorganic tanning agents also introduces into the protein compositions resistance to mold and unpalatability or toxicity of the protein for vermin, roaches, mice and other animals that thrive upon untreated protein. Also they decrease the flammability of the product and in the preferred proportion and conditions described herein make the product substantially non-flammable.

As the foaming agent which improves the initial distribution of air or other gas during the foaming of the solution and stabilizes the dispersion, there are used anion-active surface tension lowering agents, as, for example, water soluble salts of alkyl aryl sulfonates such as the sodium salt of keryl benzene sulfonate, straight or branch chain alkyl sulfates (sulfated alcohols) of which an example is sodium lauryl sulfate, a branch chain $C_{14}$ alcohol sulfate and oleyl methyl taurine sulfonate. As shown herein, these surface tension lowering agents are effective in contact with all my ingredients. They are effective, for instance, in contact with the various tanning agents including those salts which as used by me give ions of the metals selected from the group consisting of chromium, aluminum and iron.

The gas beaten in to form the foam is ordinarily air. The air is preferably introduced at a temperature between 30° and 100° C. This range of temperatures promotes desirably even and stable dispersion of the air.

As the fiber component there is used any common available inexpensive fiber of generally small diameter of cross section and rather short length. Examples of satisfactory fibers are wood pulp and particularly a low density of fibrous filler known as alpha-cellulose fluff. Asbestos or rock or glass wool in the form of short fibers also may be used to provide all or part of the fiber component.

Waterproofing agents also may be introduced. They are not ordinarily necessary, however, especially when the foamed protein product is to be enclosed finally in some other material that excludes water. When waterproofing is introduced into the foam composition, there is used to advantage inexpensive material such as asphalt, wax emulsions, or water repellent soaps suitably precipitated in the solution of the protein composition before or at about the time of the foaming.

As to proportions, considerable variations are permissible.

It is essential, however, that the protein be used in proper ratio to the water present at the time of foaming so as to give a solution that is at least of rather high concentration of the protein. Thus, there is used preferably 6 to 10 pounds of the protein to 100 pounds of water although for some purposes the range may be made somewhat greater, say 4 to 15 parts.

It is important also that the ratio of protein to the fibrous strengthening agent should be large so that the finished product is essentially a fiber reinforced protein foam in set condition rather than simply a bonded fibrous product. Thus, the proportion of the protein to fibrous material is ordinarily about 30 to 100 parts of the protein for 100 of fibrous material, best commercial results being obtained when the ratio is about 40 to 60 parts of the protein. More fiber than 100 parts cannot be properly distributed throughout the foam, particularly in the case of cellulose fluff or other wood pulp.

The protein insolubilizing and toughening agent is used in the proportion adequate to give the desired toughening and insolubilizing effect. Additional quantities are unnecessary. Preferably the insolubilizing and toughening material is used in the proportion of 5 to 20 parts for 100 parts of the protein, although an article that is sufficiently tough and strong for most purposes may be made when the proportion of the insolubilizing and toughening agent is as low as 3 parts. Also the proportion may be increased up to about 40 parts for 100 parts of the protein, although such large proportion is unnecessary and uneconomical for most purposes. Ordinarily about 12 to 20 parts of the insolubilizer are used.

The foaming agent is used in amount to lower the surface tension or cause the bubbles of air when introduced to become suspended in finely divided form, substantially permanently in the presence of the fibers and other materials present. The foaming agents are used in accordance with manufacturer's directions and conventional practice as to the amount of each that is ordinarily used to lower the surface tension of water in contact with solids. This amount is ordinarily about .5 to 15 parts to 100 parts of the glue and the surface tension is not lowered in proportion as the amount of the foaming agent is increased above the amount that is commonly used for the selected foaming agent to lower the surface tension of its aqueous solution. The proportion of 5 to 15 parts of the surface tension lowering agent for 100 of glue corresponds, when the glue varies from 4 to 15 parts for 100 of water, to 0.2 to 2.25 parts of the said agent for 100 of water.

Waterproofing when used is incorporated in amount to exclude water or decrease the absorption of vapor from humidified air without making the waterproofed article objectionably heavy and therefore low in thermal insulating power. With the insoluble soaps, paraffin wax emulsions or the like, about 2 to 10 parts by weight are adequate for 100 parts of the protein material. With asphalt, wax tailings, and less effective water repellents, the proportion may be higher, as, for instance, 50% to 80% or so of the weight of the protein material in the composition.

The permissible and preferable proportions of the ingredients may thus be summarized as follows:

| | Pounds |
|---|---|
| Glue, preferably hide glue | 100 |
| Mineral tanning agent, preferably basic chromium sulfate | 3.0 to 40 |
| Preferably | 12 to 20 |
| Foaming agent | 5 to 15 |
| Preferably | 10 |
| Fibrous filler | 150 to 330 |
| Preferably | 165 to 250 |
| Water | 660 to 2500 |
| Preferably | 1000 to 1660 |

On a dry basis the protein constitutes at least about 60% of the composition, disregarding the added fibrous filler.

The invention will be further illustrated by description in connection with the following specific examples.

*Example 1*

8 pounds of a hide glue having a jelly strength of 334, a viscosity of 109 millipoises, a grease content of 0.19%, and good foaming characteristics is dissolved in 72 pounds of water. 13 pounds of a 10% aqueous solution of a surface-active alkyl aryl sodium sulfonate (foaming agent) is added and the mixture heated to 60° C. 7 pounds of a 10% solution of a basic chromium sulfate having a basicity of about 33% is added to the above mixture with stirring just before foaming is started. Foaming of the hot solution is carried out continuously with an air-lift-baffle type apparatus such as described in U. S. Patent 1,140,548, of Vogelsang or in Industrial and Engineering Chemistry, vol. 28, pp. 422-3 (1936). Such an apparatus using a 40-mesh screen and operating at 60 pounds air pressure is adjusted to produce 6 gallons of foam per gallon of glue solution per minute. A low density fibrous filler such as A-1 alpha-cellulose fluff is immediately mixed into the foam by means of a suitable beater or mixer in the proportion of 1½ pounds of fluff to 6 gallons of foam. The mixture is then formed into sheets one inch thick or more on suitable screen belts or sections lined with a 10 or 20 pound kraft paper. The foam is dried at 110° C., to yield a strong rigid insulation board covered with an adherent sheet of light weight paper and having a density of about 2.8 pounds per cubic foot. The paper coating may be applied to one or both sides of board and serves both to overcome sticking to the supports during drying and to permit easy and economical application of the usual waterproofing and water-vapor impermeable coatings if desired.

Example 2

8 pounds of a hide glue having a jelly strength of 224 and having good foaming characteristics is dissolved in 61.5 pounds of water. To this solution is added 10 pounds of an aqueous, clay stabilized, dispersion of petroleum asphalt having a solids content of 53%. 2.5 pounds of a branch chain $C_{14}$ alcohol sulfate, a commercial solution containing 25% sodium tetradecyl sulfate as the active foaming agent, are now stirred in and the temperature is brought to 30° C. 18 pounds of a 10% solution of basic chrome sulfate having a basicity of about 33% is added to the above mixture with stirring just before the foaming operation is started. Foaming is accomplished by beating air into the composition in a wire whip mixer operating at 350 R. P. M. 15 pounds alpha cellulose are then introduced and stirred into the foam. Upon shaping and drying the resulting foam, a strong rigid board having excellent thermal insulation value is obtained. This product, containing asphalt, is characterized by a greatly improved resistance to water and water-vapor pick-up as compared to similar boards prepared without asphalt.

Example 3

The procedure of Example 1 is followed except that (1) the fibrous filler is omitted and (2) the temperature of drying is about 30° C.

The use of this low temperature requires a very long time of drying, the low temperature being necessary because of the omission of the fibrous filler. Drying at a temperature as high as 45° C. destroys the strength of the product.

The fact that the chromium sulfate is used makes the dried product rigid, low in density (about 1.6), odorless, and flameproof.

Example 4

Foam prepared continuously at 60° C. as in Example 1 but without added filler is spread onto a 16-mesh screen belt in a layer about ½ inch thick and is dried continuously at 110° C. The brittle, friable product obtained upon drying has density of about 1.4 pounds per cubic foot and is readily shredded or powdered. This may be employed as a low density loose-fill insulating material or as a filler for insulation board prepared as in Example 2.

It will be understood that it is intended to cover all changes and modifications of the examples of the invention herein chosen for the purpose of illustration which do not constitute departures from the spirit and scope of the invention.

This application is a continuation-in-part of my prior application Serial No. 535,895 filed May 16, 1944, now abandoned.

What is claimed is:

1. The process of producing a substantially rigid, lightweight thermal insulating product which comprises forming an aqueous solution containing 100 parts by weight of water, 4 to 15 parts of animal protein glue, 0.2 to 2.25 parts of an anion-active surface active agent, a water soluble animal protein glue tanning salt selected from the group consisting of a water soluble animal protein glue tanning salt of a metal selected from the group consisting of chromium, aluminum and ferric iron; and incorporating air through said aqueous solution to form a tough stable glue foam; and then mixing short length, non-comminuted fibers with said glue foam in proportion of about 30 to 100 parts of glue to 100 parts of fibers; shaping the resulting mixture to the form desired and drying the shaped product.

2. The process of producing a substantially rigid, lightweight thermal insulating product which comprises forming an aqueous solution containing 100 parts by weight of water, 4 to 15 parts of animal protein glue, 0.2 to 2.25 parts of an anion-active surface active agent selected from the group consisting of alkyl sulfates and alkyl aryl sulfonates, a water soluble animal protein tanning salt selected from the group consisting of chromium sulfate, aluminum sulfate and ferric sulfate; and incorporating air through said aqueous solution to form a tough stable glue foam; and then mixing short length, non-comminuted fibers with said glue foam in proportion of about 30 to 100 parts of glue to 100 parts of fibers; shaping the resulting mixture to the form desired and drying the shaped product.

3. The process as claim 2 in which the tanning agent is basic chromium sulfate.

4. The process of claim 2 in which the glue is hide glue.

5. The process of claim 2 in which the tanning agent is basic chromium sulfate and the glue is hide glue.

PAT MACALUSO.

REFERENCES CITED

The following references are of record in the file of this patent:

UNITED STATES PATENTS

| Number | Name | Date |
| --- | --- | --- |
| 1,782,383 | Greider | Nov. 18, 1930 |
| 2,282,190 | Jahjoh | May 5, 1942 |
| 2,433,849 | Lathrop et al. | Jan. 6, 1948 |